Nov. 22, 1966  A. MAROSY  3,286,316
COUPLING
Filed May 22, 1964  2 Sheets-Sheet 1
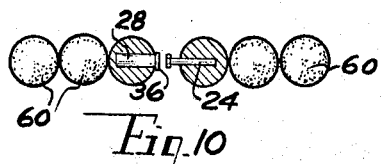
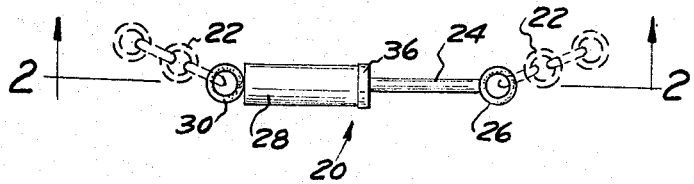
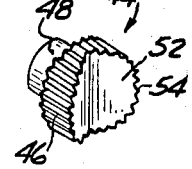
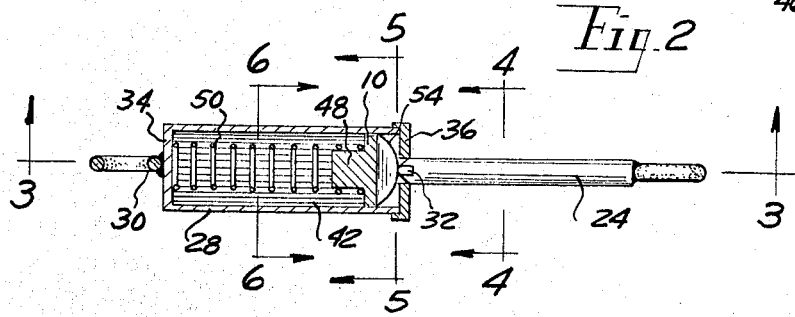
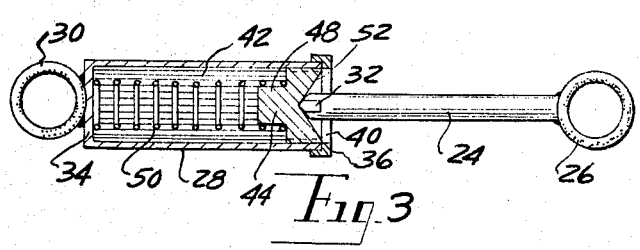
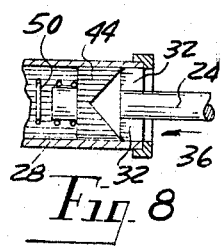
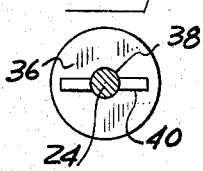
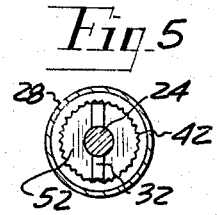
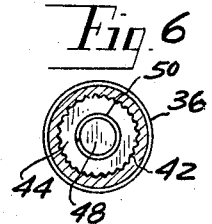
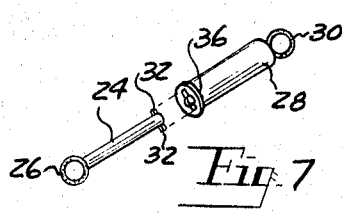
INVENTOR.
ANDRE MAROSY
BY
ATTORNEY Nov. 22, 1966          A. MAROSY          3,286,316

COUPLING

Filed May 22, 1964          2 Sheets-Sheet 2

INVENTOR.
ANDRE MAROSY
BY
WILSON, SETTLE & CRAIG
ATTORNEYS

United States Patent Office 3,286,316
Patented Nov. 22, 1966

3,286,316
COUPLING
Andre Marosy, Oak Park, Mich., assignor of seventeen and one-half percent to Nathan Roth, twenty percent to Maynard Sacra, and twenty-two and one-half percent to Norman Pattison
Filed May 22, 1964, Ser. No. 369,360
5 Claims. (Cl. 24—221)

This is a continuation-in-part of Serial Number 289,-701, filed June 21, 1963, now abandoned.

The present invention relates to a coupling, and more particularly to a coupling which is easily and quickly connected and disconnected.

The present invention is particularly adapted for use as a jewelry clasp. However, the coupling is equally useful in a variety of other applications, such as in the electrical art for connecting wires or cables together and in the mechanical art for connecting such members as tubes, garden hoses, flexible support members as ropes and the like.

One feature desired of couplings is ease of connection and disconnection. This is particularly true in the jewelry art for clasps to connect the ends of necklaces and bracelets. Such clasps are frequently very small, making them difficult to manipulate with the hands and also the clasps must frequently be connected by use of only one hand, such as in the case of bracelets, or at a position visually inaccessible, such as the back of the neck in the case of a necklace. Ease of connection and disconnection is, of course, also desirable in numerous other coupling applications. The present invention provides a coupling which not only is easy to connect and disconnect but also has a simplified, compact structure.

The object of the invention is, therefore, to provide a coupling which is easy to connect and disconnect even when made in very small sizes.

Another object of the invention is to provide such a coupling having means for securing the coupling in the connected position to guard against unintentional disconnection.

A further object of the invention is to provide a coupling having a compact and simple structure.

A yet further object of the invention is to provide a coupling which may be mounted within the ends of the elements to be coupled so as to be hidden from view when the elements are connected.

A still further object of the invention is to provide, in one embodiment, a coupling wherein a camming member is provided to automatically lock the coupling in the connected condition when the coupling members are fastened together.

Other objects of this invention will appear in the following description and appended claims, reference being had to the accompanying drawings forming a part of this specification wherein like reference characters designate corresponding parts in the several views.

In the drawings:

FIGURE 1 is a view of first embodiment of a coupling shown in closed position at two ends of a chain;

FIGURE 2 is a sectional view through the coupling of FIGURE 1 taken along lines 2—2 of FIGURE 1;

FIGURE 3 is a sectional view through the coupling at right angles to the section of FIGURE 2, taken along lines 3—3 of FIGURE 2;

FIGURE 4 is a sectional view through the coupling of FIGURE 1 taken along lines 4—4 of FIGURE 2;

FIGURE 5 is a sectional view of the coupling taken along lines 5—5 of FIGURE 2;

FIGURE 6 is a sectional view of the coupling taken along lines 6—6 of FIGURE 2;

FIGURE 7 is a view of the coupling of FIGURE 1 shown in separated relation;

FIGURE 8 is a fragmented sectional view similar to FIGURE 3 showing the male member rotated by 90°;

FIGURE 9 is a perspective view of the slide member which moves within the female member;

FIGURE 10 is a view of a second embodiment of the invention in which the coupling is incorporated in the ends of a necklace;

Figure 11:
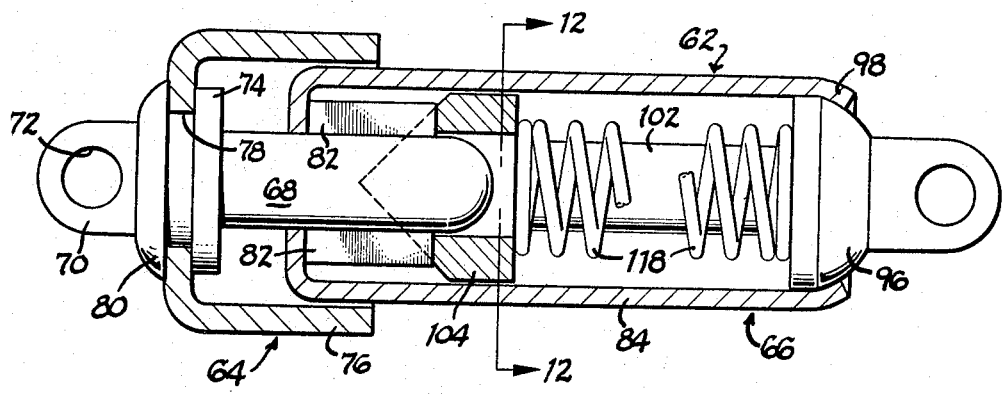
FIGURE 11 is a longitudinal sectional view of another embodiment of the coupling in accordance with the present invention.
Figure 12:
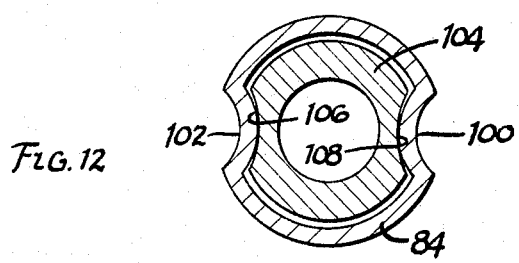
FIGURE 12 is a cross-sectional view taken substantially along the line 12—12 of FIGURE 11 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, the coupling generally indicated at 20 may be used to join two ends of a chain 22. The coupling is formed of a male member 24 which has a ring 26 affixed to one end so as to join to the chain 22, and a female member 28 which has a ring 30 joined to one of its ends and to the other end of the chain.

The male member 24 is formed with an elongated rod which has the ring 26 at one end and a pair of lateral key-like extensions 32 formed at its other end. The extensions 32 are generally rectangular in form, and they are displaced at 180° with respect to one another on the end of the male member 24 so as to extend in opposite directions.

The female member 28 is formed as a tube with the ring 30 being joined to an end plate 34 that closes one end of the tube. The other end of the tube is closed by a slotted cover plate 36 which has a central hole 38 and radiating slots 40 which are adapted to receive the male member 24 with its lateral extensions 32. The interior of the female tube 28 is formed with longitudinal serrations 42. A slide block 44 which is generally cylindrical in form has an outer diameter 46 formed with serrations which are adapted to mate with the serrations 42 so that the block 44 may slide longitudinally within the tube 28 while maintaining axial alignment therewith. The slide block 44 has a reduced diameter section 48 which is disposed so as to extend toward the end of the tube 28 which bears the ring 30. A coil spring 50 is disposed within the tube with one end over the reduced diameter section 48. The spring acts to bias the slide block 44 toward a position of abutment with the interior side of the slotted plate 36. The slide block 44 has a V groove surface 52 in its face which abuts the slotted plate 36. The edges of this V groove are rounded as at 54.

Referring to FIGURE 8, male and female members are joined together by inserting the male member with the lateral extensions 32 into the slotted plate 36. The edges of the lateral extension 32 abut the high edges of the V surface 52 as the V surface is aligned with its groove at right angles to the extension of the slots 40 in the plate 36. This causes the slide block 44 to be moved back against the force of the spring 50. The male member 24 is then rotated through 90° to the position shown in FIGURES 2 and 3. As it is rotated, the slide block 44 is allowed to move toward the slotted plate 36 as the lateral extensions 32 slide into the groove of the V surface 52.

Rotation of the lateral extensions 32 into the groove of the V is aided by the rounded edge 54. Similarly, rotation of the male member 24 from the position shown in FIGURES 2 and 3 into a position wherein it may be removed through the slotted plate 36, is opposed by the force of the spring 50 biasing the slide 44. Rotation of the male member 24 into a position wherein it may be removed from the female member requires that the slide block 44 be moved away from the cover plate 36 against the force of the spring 50. This negates the possibility that an accidental movement of the coupling will allow it to disengage.

In summary, the two ends of the coupling are joined by inserting the male member 24 through the slotted cover plate 36 and rotating it through 90° so as to allow the slide block 44 to move into abutment with the cover plate 36. The units are disengaged by re-rotating the male member 24 through 90°, so as to force the slide block 44 away from the cover plate, and withdrawing the male member through the slotted plate 36.

FIGURE 10 illustrates the manner in which the coupling may be secured to a string of beads 60. The female member 28 may be recessed within the bead forming one end of the chain so that only the cover plate 36 is visible. The male member 24 may be formed as an extension of the last bead in the other end of the string. When the two are joined, their nature as a coupling is completely hidden by the beads 60.

FIGURES 11–14 illustrate a preferred embodiment of the invention wherein the coupling 62 is automatically locked against unfastening when the male member 64 is inserted into the female member 66. It will be noted that the male member 64 is similar to the previously described member 24. The male member 64 comprises an elongated rod 68 having a projection 70 at its outer end. The projection 70 is provided with an opening 72 for attachment to the member to be coupled. A collar 74 is provided on the rod 68. A cap 76 having an opening 78 is initially received on the rod 68 and abuts against the collar 74. Portion 80 of the rod is then staked over to secure the cap 76 in place.

A pair of lateral key-like extensions 82 are formed at the inner end of the rod 68. The extensions 82 are generally rectangular in form and are displaced at 180° with respect to each other to extend in diametrically opposite directions.

The female member 66 includes a tubular element 84 having a pair of arcuate flanges 86, 88 at one end. The flanges 86, 88 are spaced apart to define peripheral slots 90, 92 for reception of the extensions 82 of the male member. The flanges also define a central opening 94 for reception of the rod 68 of the male member.

A connector element 96 is provided at the other end of the tubular member 84 for securement to the other member to be coupled. The end portion 98 of the tubular member 84 is crimped over to secure the connector 96 in place.

A pair of longitudinal, diametrically opposed inwardly extending depressions 100, 102 are formed in the side walls of the tubular member 84. The depressions 100, 102 terminate short of the end of the tubular member 84 and serve to secure the connector 96 against movement inwardly of the tubular member.

The depressions 100, 102 also serve to position and guide a locking element 104 which is slidably received in the tubular member 84. As will be noted in FIGURE 12, the locking element 104 has an annular cross section. Diametrically opposed longitudinally extending grooves 106, 108 are provided in the exterior surface of the locking element 104. The grooves 106, 108 receive the convex inner surfaces of the depressions 100, 102. It will thus be appreciated that the locking element 104 may slide longitudinally but cannot rotate relative to the tubular member 84.

Figure 13:
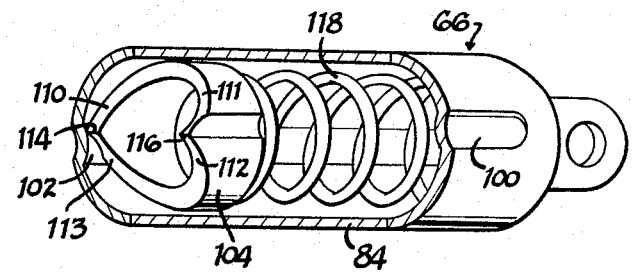
FIGURE 13 is a perspective view of the female coupling member of FIGURE 11 with parts broken away for the purpose of clarity.

Referring to FIGURES 11 and 13, it will be noted that one end of the locking element 104 is formed in the shape of an inverted V when viewed as in FIGURE 11. End surfaces 110, 111, 112, 113 extend from diametrically opposed crests 114, 116 towards the other end of the locking element and at an angle to a hypothetical plane extending through the crests 114, 116 and the longitudinal axis of the locking element. A coil spring 118 is provided within the tubular member 84 between the connector 96 and locking element 104 to bias the locking element into abutment with the end flanges 86, 88. It will be noted that the crests 114, 116 are positioned closely adjacent to the slots 90, 92 but on opposite sides thereof. This results in the portion of the end surfaces 110, 112 which are in line with the slots 90, 92 extending away from the slots in the same rotational direction. That is, the portion of the surfaces 110, 112 directly behind the slots 90, 92 as viewed in FIGURE 14 both extend in a clockwise direction away from the flanges 86, 88. This positionment is important because it results in the self-locking feature of the present invention.

Figure 14:
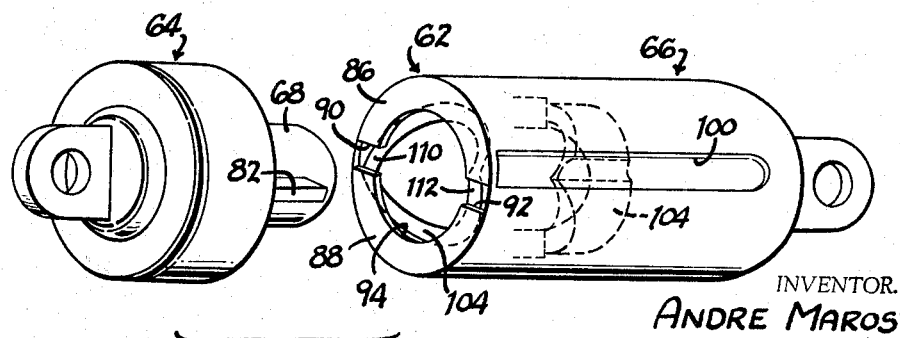
FIGURE 14 is a perspective view of the coupling of FIGURE 11 illustrating the manner in which the coupling members are fastened together.

Referring to FIGURE 14, it will be noted that the coupling is connected by first aligning the lateral extensions 82 of the male member 64 with the slots 90, 92 in the end of the female member 66. The male member 64 is then inserted into the female member 66. When the extensions 82 abut against the locking element 104, this element is forced into the tubular member 84 against the action of the spring 118. As soon as the lateral extensions 82 have passed the end flanges 86, 88, the male member 64 is free to rotate. Further insertion of the male member results in turning of the male member due to the camming action of the surfaces 110, 112 against the extensions 82. The male member 64 is eventually turned 90° to the position shown in dotted lines in FIGURE 14. At this point, further turning of the male member 64 is stopped by the reversely inclined surface portions 111, 113. The male member is then released and the spring 118 urges this member back into abutment with the end flanges 86, 88 to thus lock the coupling in the connected condition. As will be appreciated, the coupling is disconnected by manually turning the male member 64 in either the clockwise or counterclockwise direction to align the extensions 82 with the opening 90, 92 and then withdrawing the male member.

Having thus described my invention, I claim:

1. A coupling comprising a male member and a female member, the male member comprising a rod having at least one lateral extension adjacent one end thereof, the female member comprising a tubular housing, an end closure on one end of the housing having a slot operative to receive the end of the male member including the lateral extension, a locking element slidably mounted within the tubular housing, means for biasing the locking element into abutment with the interior side of said end closure, the side of said locking element adjacent to said end closure having a groove formed laterally therein with its greatest depth in the center and with at least one side sloping from said center to the edges of the locking element, guide means in the tubular housing in engagement with the locking element and positioning the locking element with an outermost point of said sloping side in alignment with the slot in the end closure of the tubular housing whereby insertion of the rod of the male member through the end closure forces the locking element away from the end closure and rotation of the male member allows the locking element to move into closer relation to said end closure.

2. A coupling, comprising a male member and a female member, said male member consisting of an elongated rod with a lateral extension at one end, and said female member consisting of a tube, a plate covering one end of said tube and having a slot therein adapted to receive the end of the male member having the lateral extension, a slide movable within said tube, means for maintaining said slide in alignment with said tube, a spring disposed in said tube and biasing said slide into abutment with the plate, the side of said slide adjacent to said plate having a V-groove formed laterally therein with its greatest depth in the center and with the sides thereof sloping away from said center to the edges of the slide, said means for maintaining said slide in alignment with said tube by positioning the slide with the outermost portions of said sloping sides in alignment with the slot in said plate, whereby the insertion of the rod through the plate forces the slide away from the plate and a rotation of the rod to bring the lateral extension into alignment with the V-groove allows the slide to move toward the plate.

3. A coupling, comprising a male member and a female member, said male member consisting of an elongated rod with a lateral extension at one end, and said female member consisting of a tube having axial serrations formed on its interior side, a plate covering one end of said tube and having a slot therein adapted to receive the end of the male member having the lateral extension, a cylindrical slide movable within said tube, serrations formed on the outer edges of said slide adapted to mate with the serrations formed on the interior side of the tube to maintain the slide in alignment with the tube, spring means disposed in said tube and biasing said slide into abutment with the plate, the side of said slide adjacent to said plate having a V-groove formed laterally therein with its greatest depth in the center and with the sides thereof sloping from said center to the edges of the slide, said mating serrations positioning the slide with the outermost portion of said sloping sides in alignment with the slot in said plate, whereby the insertion of the rod through the plate forces the slide away from the plate and a rotation of the rod to bring the lateral extension into alignment with the V-groove allows the slide to move toward the plate.

4. A coupling comprising a male member and a female member, the male member comprising a rod having a lateral extension adjacent one end thereof, the female member comprising a tubular housing, an end closure on one end of the housing having a slot operative to receive the end of the male member including the lateral extension, a locking element slidably mounted within the tubular housing, means for biasing the locking element into abutment with the interior side of said end closure, the side of said locking element adjacent to said end closure having a hollow center and an inclined end surface portion inclined away from the end at an angle thereto, guide means in the tubular housing in engagement with the locking element and positioning the locking element with an outermost point of said inclined end surface portion in alignment with the slot in the end closure of the tubular housing whereby insertion of the rod of the male member through the end closure forces the locking element away from the end closure with said inclined end surface of the locking member camming the male member about its axis to move the lateral extension out of alignment with the slot.

5. A coupling, comprising a male member and a female member, the male member comprising a rod having lateral extensions adjacent one end thereof, the female member comprising a tubular housing, an end closure on one end of the housing having slots operative to receive the end of the male member including the lateral extensions, an annular locking element slidably mounted within the tubular housing, means for biasing the locking element into abutment with the interior side of said end closure, the end surface of said locking element adjacent to said end closure comprising diverging surfaces forming an inverted V-shaped, guide means in the tubular housing in engagement with the locking element and positioning the locking element with the crests of said V-shaped end surface adjacent to said slots whereby insertion of the rod of the male member through the end closure forces the locking element away from the end closure with the end surfaces of the locking element camming the male member to rotate the male member about its axis after insertion through said closure.

References Cited by the Examiner
UNITED STATES PATENTS

| | | |
|---|---|---|
| 805,674 | 11/1905 | Senderling. |
| 1,199,690 | 9/1916 | Gillan _____ 24—221 |
| 1,795,674 | 3/1931 | Potter _____ 24—201 |
| 2,881,499 | 4/1959 | Summers et al. |
| 2,995,793 | 8/1961 | Griffiths et al. |

FOREIGN PATENTS

| | | |
|---|---|---|
| 564,108 | 3/1944 | Great Britain. |

WILLIAM FELDMAN, *Primary Examiner.*

G. WEIDENFELD, *Assistant Examiner.*